(12) United States Patent
Frind (10) Patent No.: US 9,536,221 B2
(45) Date of Patent: Jan. 3, 2017

(54) SYSTEM AND METHOD FOR ADAPTIVE MATCHING OF USER PROFILES BASED ON VIEWING AND CONTACT ACTIVITY FOR SOCIAL RELATIONSHIP SERVICES

(75) Inventor: Markus Frind, Vancouver (CA)

(73) Assignee: Plentyoffish Media ULC, Vancouver, British Columbia (CA)

( * ) Notice: Subject to any disclaimer, the term of this patent is extended or adjusted under 35 U.S.C. 154(b) by 0 days.

(21) Appl. No.: 12/488,512

(22) Filed: Jun. 19, 2009

(65) Prior Publication Data

US 2010/0262611 A1    Oct. 14, 2010

Related U.S. Application Data

(60) Provisional application No. 61/074,142, filed on Jun. 19, 2008.

(51) Int. Cl.
*G06F 17/30* (2006.01)
*G06Q 10/10* (2012.01)

(52) U.S. Cl.
CPC ......... *G06Q 10/10* (2013.01); *G06F 17/30867* (2013.01)

(58) Field of Classification Search
CPC ............. G06F 17/30029; G06F 17/30035; G06F 17/30038; G06F 17/30522; G06F 17/30525; G06F 17/30646; G06F 17/30648; G06F 17/30761; G06F 17/30764; G06F 17/30766; G06F 17/30867; G06F 17/3053; G06F 17/30905; G06F 17/27; G06F 17/30; G06F 17/30601; G06F 17/30705; G06F 17/30749; G06F 17/30864; G06F 17/3089; G06F 17/30899; G06Q 50/01; G06Q 50/203; G06Q 30/0282; G06Q 30/0631; G06Q 30/0201; G06Q 30/0202; G06Q 30/0251; G06Q 30/0256; G06Q 30/0601; G06Q 30/0633; H04L 67/306
USPC .......... 707/721, 734, 751, 999.003–999.007, 707/748
See application file for complete search history.

(56) References Cited

U.S. PATENT DOCUMENTS

| | | |
|---|---|---|
| 5,583,763 A | 12/1996 | Atcheson et al. |
| 5,749,091 A | 5/1998 | Ishida et al. |
| 5,963,951 A | 10/1999 | Collins |
| 6,006,225 A | 12/1999 | Bowman et al. |
| 6,018,738 A | 1/2000 | Breese et al. |
| 6,038,295 A | 3/2000 | Mattes |
| 6,041,311 A | 3/2000 | Chislenko et al. |
| 6,049,777 A | 4/2000 | Sheena et al. |
| 6,058,367 A | 5/2000 | Sutcliffe et al. |

(Continued)

OTHER PUBLICATIONS

Frind et al., "Apparatus, Method and Article to Facilitate Matching of Clients in a Networked Environment," U.S. Appl. No. 61/857,617, filed Jul. 23, 2013, 138 pages.

(Continued)

*Primary Examiner* — Boris Gorney
*Assistant Examiner* — Amanda Willis
(74) *Attorney, Agent, or Firm* — Seed IP Law Group LLP (57) ABSTRACT

A method and system which adaptively recommends potential relationships to individual users based on a set of items that are known to be of interest to the user, such as a set of potential matches previously messaged by the user. The system generates the adaptive recommendations using previously-generated user activity that indicates the user's preferences of particular attributes.

12 Claims, 4 Drawing Sheets

(56) References Cited

U.S. PATENT DOCUMENTS

| | | | |
|---|---|---|---|
| 6,064,980 A | 5/2000 | Jacobi et al. | |
| 6,134,532 A * | 10/2000 | Lazarus et al. | 705/14.25 |
| 6,169,986 B1 | 1/2001 | Bowman et al. | |
| 6,199,067 B1 | 3/2001 | Geller | |
| 6,266,649 B1 | 7/2001 | Linden et al. | |
| 6,356,879 B2 | 3/2002 | Aggarwal et al. | |
| 6,735,568 B1 * | 5/2004 | Buckwalter et al. | 705/319 |
| 6,772,150 B1 | 8/2004 | Whitman et al. | |
| 6,782,370 B1 | 8/2004 | Stack | |
| 6,783,065 B2 | 8/2004 | Spitz et al. | |
| 6,853,982 B2 | 2/2005 | Smith et al. | |
| 6,912,505 B2 | 6/2005 | Linden et al. | |
| 7,113,917 B2 | 9/2006 | Jacobi et al. | |
| 7,240,353 B2 | 7/2007 | Lau et al. | |
| 7,313,536 B2 | 12/2007 | Westphal | |
| 7,324,998 B2 * | 1/2008 | Beres et al. | |
| 8,122,142 B1 | 2/2012 | Svendsen et al. | |
| 8,180,765 B2 | 5/2012 | Nicolov | |
| 8,566,938 B1 | 10/2013 | Prakash et al. | |
| 8,577,874 B2 | 11/2013 | Svendsen et al. | |
| 8,620,790 B2 | 12/2013 | Priebatsch | |
| 8,626,663 B2 | 1/2014 | Nightengale et al. | |
| 8,825,802 B2 | 9/2014 | Pearce | |
| 8,930,398 B1 | 1/2015 | Kishore et al. | |
| 9,047,611 B2 | 6/2015 | Krishnamoorthy et al. | |
| 9,069,945 B2 | 6/2015 | Singh | |
| 9,219,704 B2 | 12/2015 | Hamlin et al. | |
| 2002/0095303 A1 | 7/2002 | Asayama et al. | |
| 2002/0156632 A1 | 10/2002 | Haynes et al. | |
| 2003/0093405 A1 | 5/2003 | Mayer | |
| 2003/0234519 A1 | 12/2003 | Farmer | |
| 2004/0012638 A1 | 1/2004 | Donnelli et al. | |
| 2005/0027707 A1 | 2/2005 | Syed | |
| 2005/0108227 A1 * | 5/2005 | Russell-Falla et al. | 707/5 |
| 2005/0108344 A1 | 5/2005 | Tafoya et al. | |
| 2005/0240608 A1 | 10/2005 | Jones et al. | |
| 2006/0018522 A1 | 1/2006 | Sunzeri et al. | |
| 2006/0059142 A1 * | 3/2006 | Zvinyatskovsky et al. | 707/5 |
| 2006/0256959 A1 | 11/2006 | Hymes | |
| 2007/0005587 A1 * | 1/2007 | Johnson et al. | 707/5 |
| 2007/0112792 A1 * | 5/2007 | Majumder | 707/100 |
| 2007/0206917 A1 | 9/2007 | Ono et al. | |
| 2007/0265962 A1 | 11/2007 | Bowe, Jr. et al. | |
| 2008/0039121 A1 | 2/2008 | Muller et al. | |
| 2008/0086534 A1 | 4/2008 | Bardak et al. | |
| 2008/0103971 A1 | 5/2008 | Lukose et al. | |
| 2009/0066722 A1 | 3/2009 | Kriger et al. | |
| 2009/0094048 A1 | 4/2009 | Wallace et al. | |
| 2009/0106043 A1 | 4/2009 | Buckwalter et al. | |
| 2009/0144201 A1 | 6/2009 | Marlow | |
| 2009/0164464 A1 | 6/2009 | Carrico et al. | |
| 2009/0216734 A1 * | 8/2009 | Aghajanyan et al. | 707/5 |
| 2009/0248599 A1 | 10/2009 | Hueter et al. | |
| 2009/0299645 A1 | 12/2009 | Colby et al. | |
| 2010/0002920 A1 | 1/2010 | Cosatto et al. | |
| 2010/0036806 A1 | 2/2010 | Lam et al. | |
| 2010/0114614 A1 | 5/2010 | Sharpe | |
| 2010/0169376 A1 | 7/2010 | Chu | |
| 2010/0318544 A1 * | 12/2010 | Nicolov | 707/759 |
| 2011/0107260 A1 | 5/2011 | Park et al. | |
| 2011/0131085 A1 | 6/2011 | Wey | |
| 2011/0167059 A1 | 7/2011 | Fallah | |
| 2011/0178881 A1 | 7/2011 | Pulletikurty | |
| 2011/0219310 A1 | 9/2011 | Robson | |
| 2011/0270813 A1 | 11/2011 | Cok et al. | |
| 2011/0306028 A1 | 12/2011 | Galimore | |
| 2012/0059850 A1 | 3/2012 | Bent et al. | |
| 2012/0088524 A1 | 4/2012 | Moldavsky et al. | |
| 2012/0102410 A1 | 4/2012 | Gewecke et al. | |
| 2012/0110085 A1 | 5/2012 | Malik et al. | |
| 2012/0123828 A1 | 5/2012 | Pahls et al. | |
| 2012/0166285 A1 | 6/2012 | Shapiro et al. | |
| 2012/0190386 A1 | 7/2012 | Anderson | |
| 2012/0198002 A1 | 8/2012 | Goulart et al. | |
| 2012/0284341 A1 | 11/2012 | Masood et al. | |
| 2013/0138741 A1 | 5/2013 | Redstone et al. | |
| 2013/0262984 A1 | 10/2013 | Mehr et al. | |
| 2013/0282745 A1 | 10/2013 | Mishra et al. | |
| 2014/0052861 A1 | 2/2014 | Frind et al. | |
| 2014/0095598 A1 | 4/2014 | Schornack et al. | |
| 2014/0095603 A1 | 4/2014 | Bhardwaj et al. | |
| 2014/0122628 A1 | 5/2014 | Yao et al. | |
| 2014/0136933 A1 | 5/2014 | Berger et al. | |
| 2014/0156750 A1 | 6/2014 | De Cristofaro et al. | |
| 2014/0207637 A1 | 7/2014 | Groarke | |

OTHER PUBLICATIONS

Frind et al., "Systems and Methods for Training and Employing a Machine Learning System in Evaluating Entity Pairs," U.S. Appl. No. 14/163,849, filed Jan. 24, 2014, 75 pages.

Kuchka et al., "Apparatus, Method and Article to Identify Discrepancies Between Clients and in Response Prompt Clients in a Networked Environment," U.S. Appl. No. 14/204,939, filed Mar. 11, 2014, 92 pages.

Levi et al., "Apparatus, Method and Article to Effect User Interest-Based Matching in a Network Environment," U.S. Appl. No. 61/976,296, filed Apr. 7, 2014, 111 pages.

Levi et al., "Apparatus, Method and Article to Facilitate Automatic Detection and Removal of Fraudulent User Information in a Network Environment," U.S. Appl. No. 61/911,908, filed Dec. 4, 2013, 88 pages.

MacKinnon, "Apparatus, Method and Article to Facilitate Exchange of Messages in a Network Environment," U.S. Appl. No. 61/918,466, filed Dec. 19, 2013, 83 pages.

Oldridge et al., "Apparatus, Method and Article to Effect Electronic Message Reply Rate Matching in a Network Environment," U.S. Appl. No. 61/914,154, filed Dec. 10, 2013, 50 pages.

Oldridge et al., "Systems and Methods for Training and Employing a Machine Learning System in Providing Service Level Upgrade Offers," U.S. Appl. No. 61/974,129, filed Apr. 2, 2014, 95 pages.

Tekle et al., "Apparatus, Method and Article to Facilitate Automatic Detection and Removal of Fraudulent Advertising Accounts in a Network Environment," U.S. Appl. No. 61/948,159, filed Mar. 5, 2014, 79 pages.

"Binary search tree," Wikipedia, retrieved on Feb. 24, 2015, from http://en.wikipedia.org/wiki/Binary_search_tree, 11 pages.

"Chargeback," Wikipedia, retrieved on Feb. 24, 2015, from http://en.wikipedia.org/wiki/Chargeback, 4 pages.

"Merchant account," Wikipedia, retrieved on Feb. 24, 2015, from http://en.wikipedia.org/wiki/Merchant_account, 10 pages.

"Understanding Chargebacks: A Guide to Chargebacks for Online Merchants," DalPay, retrieved on Feb. 24, 2015, from https://www.dalpay.com/en/support/chargebacks.html, 6 pages.

Levi et al., "Apparatus, Method and Article to Effect User Interest-Based Matching in a Network Environment," U.S. Appl. No. 14/668,808, filed Mar. 25, 2015, 111 pages.

Oldridge et al., "Apparatus, Method and Article to Predict and Prevent Chargebacks in a Network Environment," U.S. Appl. No. 14/679,792, filed Apr. 6, 2015, 69 pages.

Oldridge et al., "Systems and Methods for Training and Employing a Machine Learning System in Providing Service Level Upgrade Offers," U.S. Appl. No. 14/672,749, filed Mar. 30, 2015, 95 pages.

Tekle et al., "Apparatus, Method and Article to Facilitate Automatic Detection and Removal of Fraudulent Advertising Accounts in a Network Environment," U.S. Appl. No. 14/638,225, filed Mar. 4, 2015, 79 pages.

Therneau et al., "An Introduction to Recursive Partitioning Using the RPART Routines," Mayo Clinic, Feb. 24, 2015, 62 pages.

Frind et al., "Apparatus, Method and Article to Facilitate Matching of Clients in a Networked Environment," U.S. Appl. No. 14/339,328, filed Jul. 23, 2014, 135 pages.

Frind et al., "Apparatus, Method and Article to Facilitate Matching of Clients in a Networked Environment," Preliminary Amendment filed Jul. 23, 2014, for U.S. Appl. No. 14/339,328, 11 pages.

(56) References Cited

OTHER PUBLICATIONS

Levi et al., "Apparatus, Method and Article to Facilitate Automatic Detection and Removal of Fraudulent User Information in a Network Environment," U.S. Appl. No. 14/561,004, filed Dec. 4, 2014, 89 pages.

MacKinnon, "Apparatus, Method and Article to Facilitate Exchange of Messages in a Network Environment," U.S. Appl. No. 14/575,888, filed Dec. 18, 2014, 83 pages.

Oldridge et al., "Apparatus, Method and Article to Effect Electronic Message Reply Rate Matching in a Network Environment," U.S. Appl. No. 14/563,504, filed Dec. 8, 2014, 55 pages.

Oldridge et al., "Apparatus, Method and Article to Facilitate User Behavioral Based Determination of User Values in a Network Environment," U.S. Appl. No. 62/013,849, filed Jun. 18, 2014, 68 pages.

Frind et al., "Systems and Methods for Training and Employing a Machine Learning System in Evaluating Entity Pairs," Office Action, mailed Jan. 29, 2016, for U.S. Appl. No. 14/163,849, 61 pages.

Frind et al., "System and Methods for Training and Employing a Machine Learning System in Evaluating Entity Pairs," Amendment filed May 27, 2016, for U.S. Appl. No. 14/163,849, 23 pages.

Frind et al., "System and Methods for Training and Employing a Machine Learning System in Evaluating Entity Pairs," U.S. Appl. No. 61/756,912, filed Jan. 25, 2013, 75 pages.

Frind et al., "Apparatus, Method and Article to Facilitate Matching of Clients in a Networked Environment," Office Action, mailed Apr. 6, 2016, for U.S. Appl. No. 13/971,483, 26 pages.

Frind et al., "Apparatus, Method and Article to Facilitate Matching of Clients in a Networked Environment," U.S. Appl. No. 61/691,082, filed Aug. 20, 2012, 131 pages.

Kuchka et al., "Apparatus, Method and Article to Identify Discrepancies Between Clients and in Response Prompt Clients in a Networked Environment," Office Action, mailed Apr. 4, 2016, for U.S. Appl. No. 14/204,939, 80 pages.

Kuchka et al., "Apparatus, Method and Article to Identify Discrepancies Between Clients and in Response Prompt Clients in a Networked Environment," U.S. Appl. No. 61/780,391, filed Mar. 13, 2013, 92 pages.

Oldridge et al., "Apparatus, Method and Article to Facilitate User Behavioral Based Determination of User Values in a Network Environment," U.S. Appl. No. 14/737,121, filed Jun. 11, 2015, 68 pages.

Frind et al., "Apparatus, Method and Article to Facilitate Matching of Clients in a Networked Environment," Office Action mailed Sep. 21, 2015, for U.S. Appl. No. 13/971,483, 25 pages.

Frind et al., "Apparatus, Method and Article to Facilitate Matching of Clients in a Networked Environment," Amendment filed Dec. 8, 2015, for U.S. Appl. No. 13/971,483, 33 pages.

Frind et al., "Apparatus, Method and Article to Facilitate Matching of Clients in a Networked Environment," Response Under 37 CFR 1.116, dated Jul. 21, 2016, for U.S. Appl. No. 13/971,483, 21 pages.

Frind et al., "Systems and Methods for Training and Employing a Machine Learning System in Evaluating Entity Pairs," Office Action, mailed Aug. 16, 2016, for U.S. Appl. No. 14/163,849, 60 pages.

Kuchka et al., "Apparatus, Method and Article to Identify Discrepancies Between Clients and in Response Prompt Clients in a Networked Environment," Office Action, mailed Sep. 8, 2016, for U.S. Appl. No. 14/204,939, 104 pages.

Kuchka et al., "Apparatus, Method and Article to Identify Discrepancies Between Clients and in Response Prompt Clients in a Networked Environment," Amendment, dated Aug. 4, 2016, for U.S. Appl. No. 14/204,939, 38 pages.

Fiore et al., "Assessing Attractiveness in Online Dating Profiles," *CHI 2008 Proceedings—Friends, Foe, and Family*, pp. 797-806, 2008.

Office Action, dated Sep. 20, 2016, for U.S. Appl. No. 14/339,328, Frind et al., "Apparatus, Method and Article to Facilitate Matching of Clients in a Networked Environment," 30 Pages.

\* cited by examiner

| Population Frequency | | |
|---|---|---|
| Attribute | Value | Frequency |
| Height > 5' 10" | YES | 60% |
| Smoker | NO | 70% |

310

| User Viewing and Contact Frequency | | |
|---|---|---|
| Attribute | Value | Frequency |
| Height > 5' 10" | YES | 80% |
| Smoker | NO | 60% |

320

| Weighted User Preference Factors | | |
|---|---|---|
| Attribute | User Freq. /Population | Weighting Factor (User/Pop. Freq − 1.00) |
| Height > 5' 10" | 80/60 | +0.33 |
| Smoker | 60/70 | −0.14 |

| Example Four User Population with Two Attributes | | |
|---|---|---|
| User | Height > 5' 10" | Smoker |
| User One | YES | NO |
| User Two | YES | YES |
| User Three | NO | NO |
| User Four | NO | YES |

410

| User Ranking Score Based on Weighted Values | | | | |
|---|---|---|---|---|
| User | Base Score | Height Score +/- 0.33 | Smoker Score +/- 0.14 | Total Score |
| User One | 100 | 0.33*100=33 | 0.14*100=14 | 147 |
| User Two | 100 | 0.33*100=33 | -0.14*100=-14 | 119 |
| User Three | 100 | -0.33*100=-33 | 0.14*100=14 | 86 |
| User Four | 100 | -0.33*100=-33 | -0.14*100=-14 | 53 |

FIGURE 4

SYSTEM AND METHOD FOR ADAPTIVE MATCHING OF USER PROFILES BASED ON VIEWING AND CONTACT ACTIVITY FOR SOCIAL RELATIONSHIP SERVICES

CROSS REFERENCE TO RELATED APPLICATIONS

This application claims the benefit, under 35 U.S.C. §119(e), of U.S. Provisional Patent Application No. 61/074,142, filed Jun. 19, 2008, the contents of which are hereby incorporated by reference.

FIELD OF THE INVENTION

The present systems and methods relate to the field of online dating and social relationship services, and more particularly to a system and method of adaptively selecting and displaying potential user profile matches based upon a user's prior viewing and selection history.

BACKGROUND OF THE INVENTION

Online dating and social relationship services have become a popular way for individuals to meet and to begin relationships whether for friendship, romance, or the pursuit of shared interests. As Internet-based technology has evolved, so have the online dating services and social relationship services. What began as chat rooms and sometimes even as telephone-based services have evolved into more sophisticated services offering photographs, videos, highly detailed profiles and predictive compatibility tests all intended to allow a user to be matched more precisely with a set of potential new acquaintances or dates.

Unfortunately, the fault with these highly detailed profiles and with the search functions and predictive compatibility tests built upon them is contained in a simple truth: what people say they wish to do is not exactly what they will actually do and that the things that people say they want are not necessarily the things that these same people actually want.

On one particular dating site, plentyoffish.com, a complex variability has been observed between the desired characteristics of a potential match that a user will describe in completing a user survey and in the characteristics that exist within the profiles that the user actually chooses to view or select for further contact.

For example, in filling out a user survey, the user may indicate a preference for non-smokers, but in selecting profiles to view and users to contact, may not pay much attention to the attribute of smoking.

Conversely, a user may indicate in the user survey a preference for matches who are taller than 5'10" and then adhere to that criterion when selecting user profiles.

One facet of the problem in providing an optimal selection of user profiles based upon survey responses is that not all questions on an online dating or social relationship survey are meaningful or important to each user. Even if the survey would allow a user to specify an importance for each attribute, the user's estimation could still be in error. The observed activity of the user in relation to candidate user profiles, recorded over time, is a better measure of their actual preferences and predictor of their future preferences.

There exists then, a need for an online dating service or social relationship service where the selection of potential matches to be displayed to a particular user is adaptive to the actual interests and desires of that user based upon his or her actual viewing and contact history in addition to the interest and desire information originally reported and maintained in the user's profile.

SUMMARY OF THE INVENTION

In one aspect of the present systems and methods, a computer-implemented method of matching a user of a social relationship service and a set of candidate user profiles for viewing and contact comprises providing a plurality of candidate user profiles to said user, recording said user's viewing and contact actions in relation to said candidate user profiles, correlating said user's viewing and contact actions to a plurality of user profile attribute values, identifying a second set of candidate user profiles based upon said correlated profile attribute values, and providing said second set of candidate user profiles to said user.

In a second aspect of the present systems and methods, a computer-implemented method of determining the preferences of a user of a social relationship service for candidate user profiles based upon said user's viewing and contact histories comprises correlating said user's viewing and contact history to a plurality of user profile attribute values, calculating weighting factors for the importance of each user profile attribute; and using said correlated user preferences and said weighting factors to determine a total ranking score per candidate user profile; and retrieving and ordering said candidate user profiles from a data store based upon their ranking scores.

In a third aspect of the present systems and methods, a computer-implemented method of selecting and displaying user profile records comprises correlating a user's viewing and selection-for-contact choices with a plurality of attribute values and querying user profile records within a data store based upon said plurality of attribute values.

In a fourth aspect of the present systems and methods, a computer-implemented method of matching a user of an online dating service and a set of candidate user profiles for viewing and contact comprises providing a plurality of candidate user profiles to said user, recording said user's viewing and contact actions in relation to said candidate user profiles, correlating said user's viewing and contact actions to a plurality of user profile attribute values, identifying a second set of candidate user profiles based upon said correlated profile attribute values; and providing said second set of candidate user profiles to said user.

In a fifth aspect of the present systems and methods, a computer-implemented method of matching a user of a social relationship service and a set of candidate user profiles for viewing and contact comprises providing a plurality of candidate user profiles to said user, recording said user's viewing and contact actions in relation to said candidate user profiles, correlating said user's viewing and contact actions to a plurality of user profile attribute values, identifying a second set of candidate user profiles based upon said correlated profile attribute values; and providing said second set of candidate user profiles to said user.

In a sixth aspect to the present systems and methods, a computer-readable storage medium containing a set of instructions for a computer program comprises a display module for providing a plurality of candidate user profiles to said user, a recording module for recording said user's viewing and contact actions in relation to said candidate user profiles, a correlation module for correlating said user's viewing and contact actions to a plurality of user profile attribute values, and a query module for identifying and retrieving a second set of candidate user profiles from a data store based upon said correlated profile attribute values.

These and other features, aspects and advantages of the present systems and methods will become better understood with reference to the following drawings, description and claims.

DETAILED DESCRIPTION OF THE INVENTION

The following detailed description is of the currently contemplated modes of carrying out the present systems and methods. The description is not to be taken in a limiting sense, but is made merely for the purpose of illustrating the general principles of the present systems and methods, since the scope of the present systems and methods is best defined by the appended claims.

Figure 1:
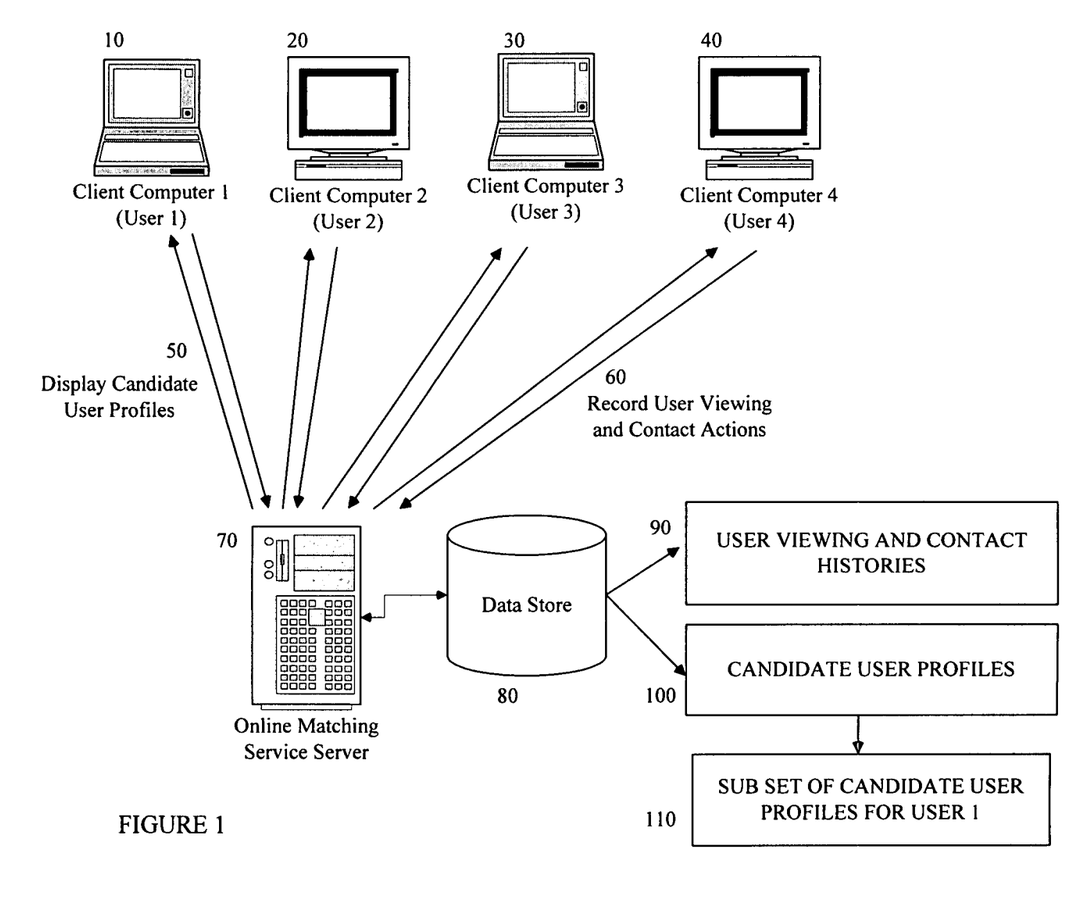
FIG. 1 is a system diagram illustrating the components of the user profile matching service according to at least an aspect of the present systems and methods.

In one embodiment of the present systems and methods, a social relationship service is implemented across a distributed network of computers. FIG. 1 illustrates a system diagram of such an embodiment.

The system includes a number of client computers 10, 20, 30, and 40, connected via network connections 50 and 60 to an online matching service server 70. This online matching service server 70 has access to a data store 80 in which are data set representing the user viewing and contact histories 90 of all users. In addition, the data store includes the candidate user profiles 100 of all users in the system. Candidate user profiles are any user profiles within the online matching service other than the user's own (though an exclusion of all user profiles not matching the user's gender preference are usually excluded).

In response to a user request on one of the client computers 10, 20, 30 and 40, the online matching server 70 and data store 80 are capable of producing the sub set of candidate user profiles for a user 110, as shown.

Figure 2:
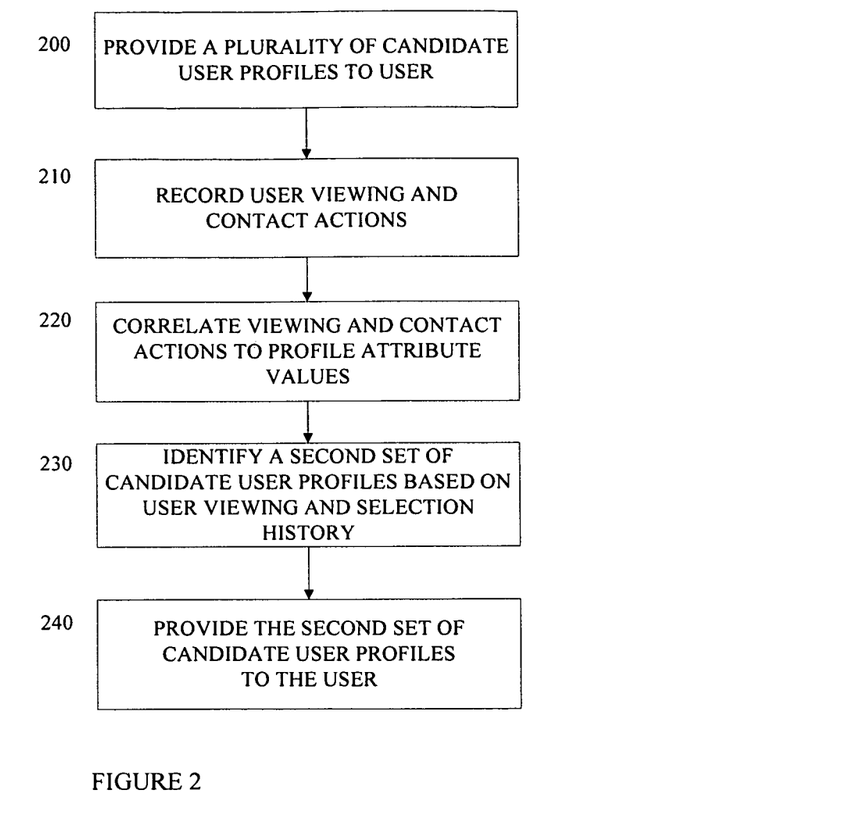
FIG. 2 is flow chart illustrating the user profile matching service according to at least an aspect of the present systems and methods.

FIG. 2 illustrates a process of the online matching service. The process begins by providing a plurality of candidate user profiles to a user in 200. Next, the user's viewing and contact actions are recorded in 210 and then correlated to user profile attribute values in 220.

Based upon the user's viewing and selection history, a second set of candidate user profiles is identified in 230 and then retrieved and provided to the user in 240.

Figure 3:
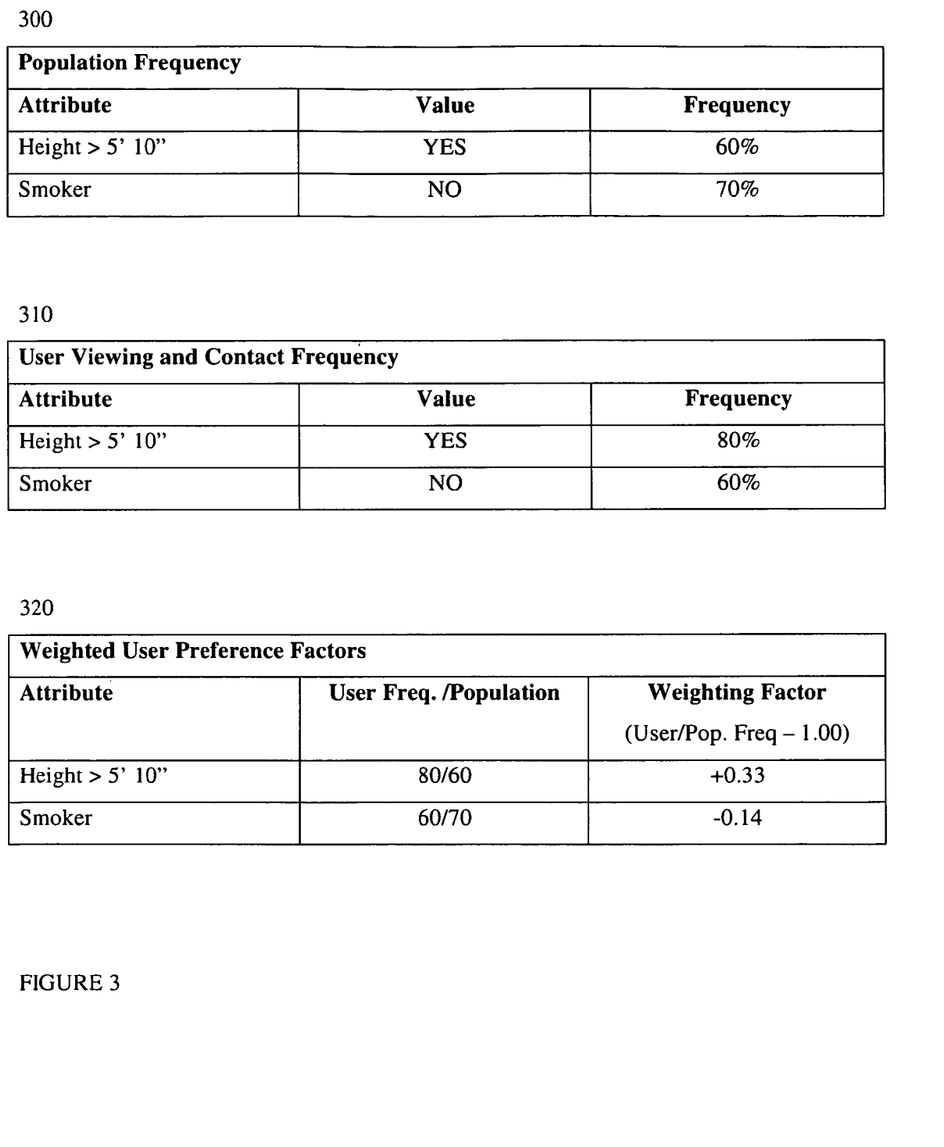
FIG. 3 is an illustration of the use of population frequency and user viewing and contact frequencies to create weighting factors according to at least an aspect of the present systems and methods.

In an embodiment of the present systems and methods, the correlation of user factors to candidate user profiles is augmented by the use of weighting factors to represent the importance of the particular profile attribute to the user's selection of a profile for viewing or for contact. FIG. 3 provides an illustration of the process of calculating these weighting factors.

FIG. 3 shows three tables. The first table, the Population Frequency table 300, shows the frequency of values for two user profile attributes, "height over 5'10"" and "smoker," within the total population of candidate user profiles.

The second table, User Viewing and Contact Frequency 310, shows the frequency with which a user selected a user profile with that attribute value for viewing or chose to make contact with that user.

The third table, the Weighted User Preference Factors table 320, shows one embodiment of a calculation of a weighting factor for each user profile attribute based upon the ratio of user viewing and contact frequency to population frequency. In this embodiment, the weighting factor is calculated by taking the ratio of the user viewing and contact frequency and dividing it by the population frequency of an attribute and then subtracting the result from 1.0 to get a normalized result with either a positive or negative sign.

These weighting factors can then be applied to rank candidate user profiles and then to select and display candidate user profiles based upon rank.

Figure 4:
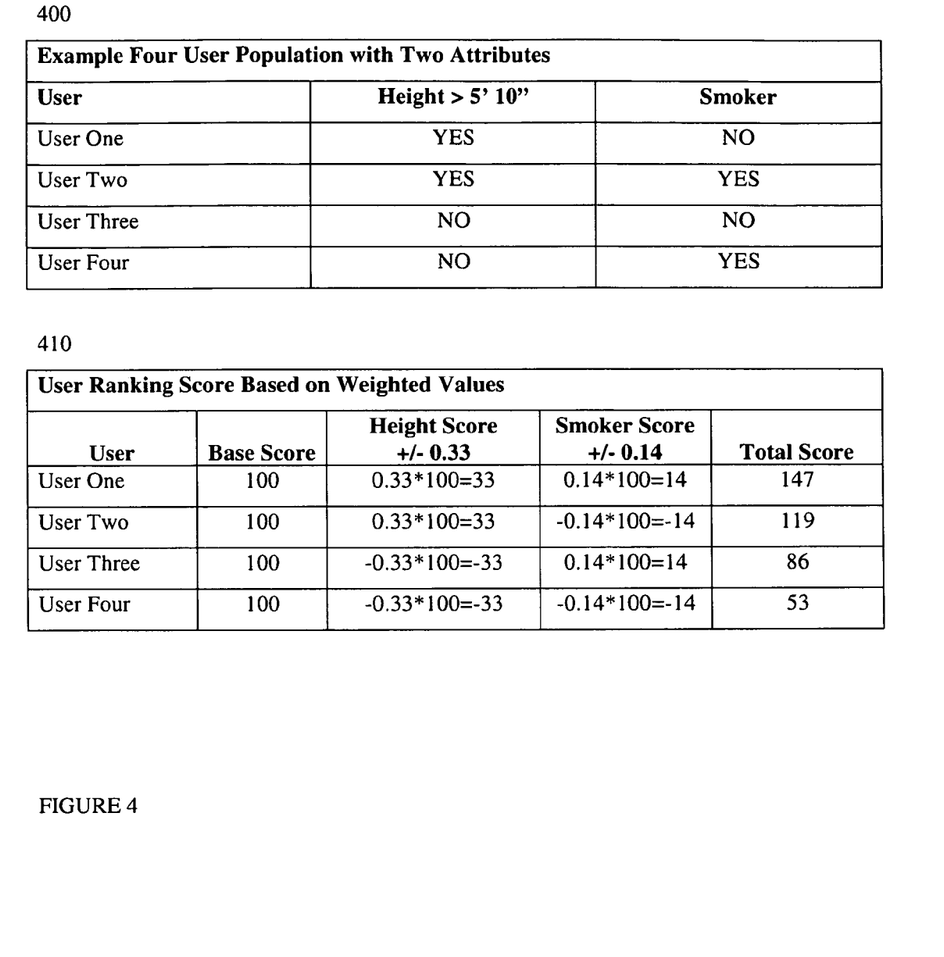
FIG. 4 is an illustration of the use of attribute occurrence and weighting factors to produce rankings of user profiles within a hypothetical example population according to at least an aspect of the present systems and methods.

FIG. 4 provides an example of an embodiment of the present systems and methods, using a hypothetical four user population to show how one may apply the weighting factors of table 320 to a four user population with a set of respective attributes and user preference factors.

The first table 400 shows four users in a hypothetical user profile data store, Each of the candidate users possess two attributes: (Height >5'10) and whether a user is a smoker.

For purposes of this example, we assume that the user prefers to view and contact profiles of users with Height >5'10 and also prefers non-smokers.

The second table, 410, shows the result of calculating a ranking score based upon the weighting factors previously calculated in table 320 from FIG. 3. Each user may begin with a base score of 100. This score is then adjusted by taking each of the weighting factors and multiplying by the base factor. Lastly, if a candidate profile matches the user preference factor we may represent the weighting factor as a positive number in table 410 (e.g., +1), and if a candidate profile does not match the user preference factor we may represent the weighting factor as a negative number in table 410 (e.g., −1).

For user one, who is a strong match for the user, we would calculate as follows:

(base score)+

(height weighting factor*100*[−1 or 1 for attribute])+

(smoker weighting factor*100*[−1 or 1 for attribute])=total score

Yielding for user one:

100+0.33*100*1+−0.14*100*−1=100+33+14=147.

FIG. 4 shows the results of these calculations for each user in the candidate user profile pool in table 410.

The selection of user profiles may also, optionally, be affected by two additional features of the adaptable matching system used to configure how quickly the system adapts and what level of randomness to seed into the user results.

The first of these factors, an adaptability factor, can be used to limit how quickly the matching engine adapts to the user's observed preferences. The easiest way to think about the utility of this factor is to return to the example of the user in FIG. 3 who has expressed a preference for non-smokers, but who may actually view and contact smokers as well as non-smokers.

Let us assume for purposes of example that the user has just signed up with the online service and has clicked on a single user profile before being pulled away from his or her computer to answer an incoming telephone call. Let us further assume the user profile viewed happened to be that of a smoker.

It turns out to be several hours before the user is able to return to the online service. As the user logs in, the question becomes, how many smokers and non-smokers should the matching engine select to display to the user? Based on the user's viewing and contact history, we see that the user has selected the profiles of smokers 100% of the time (the one single click after signing up with the service). It is undesirable to make a radical change in the selected set of user profiles (to show only smokers) on the basis of a single observation. It is useful, therefore, to have an adaptability factor, expressed as a number or a percentage that limits how quickly the system should adapt to changes in the user's observed preferences.

A second factor, a random sample percentage, may provide a different function. The random sample percentage may help to preserve the ability of the system to continue to adapt once the user's observed preferences have been stable for some time. The random sample percentage may be used to configure a percentage of the user profiles that will be presented to the user that are randomly selected, or at least randomly selected on the basis of one or more attributes.

It should be understood, of course, that the foregoing relates to exemplary embodiments of the present systems and methods and that modifications may be made without departing from the spirit and scope of the present systems and methods as set forth in the following claims.

I claim:

1. A method of operating a matching system including at least one nontransitory computer-readable medium that stores a data store including a plurality of candidate user profiles, each of the plurality of candidate user profiles includes a number of user-reported user profile attribute values (UUPAVs) which represent attributes reported by respective candidate users, the matching system further including at least one processor communicatively coupled to the nontransitory computer-readable medium to match users of a social relationship service with respective ones of the candidate user profiles for viewing and contact by the users, the method comprising:

selecting at least some of the UUPAVs included in the plurality of candidate user profiles;

for each of the selected UUPAVs, determining, by the at least one processor, a population frequency for the UUPAV, wherein the population frequency represents the frequency with which the UUPAV is present in the plurality of candidate user profiles;

querying the data store by the at least one processor for a first set of the candidate user profiles on behalf of a first user;

providing the first set of the candidate user profiles to the first user;

recording, by the at least one processor in the at least one nontransitory computer-readable medium, a number of viewing actions of the first user, each of the number of viewing actions represents a viewing of one of the candidate user profiles in the first set of the candidate user profiles by the first user;

for each of the number of recorded viewing actions, recording, by the at least one processor in the at least one nontransitory computer-readable medium, whether each of the selected UUPAVs is present in each of the respective candidate user profiles in the first set of candidate user profiles viewed by the first user;

recording, by the at least one processor in the at least one nontransitory computer-readable medium, a number of contact actions of the first user, each of the number of contact actions represents a contact between the first user and respective ones of candidate users represented by the first set of candidate user profiles;

for each of the number of recorded contact actions, recording, by the at least one processor in the at least one nontransitory computer-readable medium, whether each of the selected UUPAVs is present in each of the respective candidate user profiles in the first set of candidate user profiles contacted by the first user;

for each of the selected UUPAVs, determining, by the at least one processor, a frequency for the selected UUPAV, wherein the determined frequency represents a frequency with which the user views candidate user profiles having the selected UUPAV or contacts users having the selected UUPAV;

for each of the selected UUPAVs, generating, by the at least one processor, a weighting factor based at least in part on a comparison between the determined frequency of the selected UUPAVs for the first user and the determined population frequency for the selected UUPAVs;

querying the data store by the at least one processor on behalf of the first user for a second set of candidate user profiles based at least in part on the generated weighting factors for the selected UUPAVs; and providing, by the at least one processor, the second set of the candidate user profiles to the first user.

2. The method of claim 1 wherein recording the number of viewing actions of the first user and the number of contact actions of the first user includes recording the viewing and contact actions of the first user across multiple browsing sessions.

3. The method of claim 1 wherein recording the number of viewing actions of the first user and the number of contact actions of the first user includes recording the viewing and contact actions across an entire browsing history of the first user.

4. The method of claim 1 wherein providing the first set of the candidate user profiles to the first user includes:

transmitting the first set of the candidate user profiles over a distributed network of computers for display by a respective one of the computers which is operated by the first user.

5. The method of claim 1 wherein providing the second set of the candidate user profiles to the user includes:

transmitting the second set of the candidate user profiles over a distributed network of computers for display by a respective one of the computers which is operated by the first user.

6. The method of claim 1, further comprising:

making the social relationship service available across a distributed computer network.

7. The method of claim 1 wherein the social relationship service is an online business or professional networking service.

8. The method of claim 1, further comprising:
applying an adaptability factor to adjust how quickly the viewing and contact actions of the first user affect the weighting factors used in querying the data store.

9. The method of claim 1, further comprising:
ranking the second set of results by the at least one processor according to the generated weighting factors.

10. The method of claim 1 wherein generating a weighting factor based at least in part on a comparison between the determined frequency of the selected UUPAV for the first user and the determined population frequency for the selected UUPAV comprises generating a weighting factor which is based at least in part on a ratio of the frequency to the population frequency.

11. The method of claim 10 wherein generating a weighting factor which is based at least in part on a ratio of the frequency to the population frequency comprises normalizing the weighting factor.

12. A method of operating a matching system including at least one nontransitory computer-readable medium that stores a data store including a plurality of candidate user profiles, each of the plurality of candidate user profiles includes a number of user-reported user profile attribute values (UUPAVs) which represent attributes reported by respective candidate users, the matching system further including at least one processor communicatively coupled to the nontransitory computer-readable medium to match users of a social relationship service with respective ones of the candidate user profiles for viewing and contact by the users, the method comprising:

selecting at least some of the UUPAVs included in the plurality of candidate user profiles;

for each of the selected UUPAVs, determining, by the at least one processor, a population frequency for the UUPAV, wherein the population frequency represents the frequency with which the UUPAV is present in the plurality of candidate user profiles;

querying the data store by the at least one processor for a first set of the candidate user profiles on behalf of a first user;

providing the first set of the candidate user profiles to the first user;

recording, by the at least one processor in the at least one nontransitory computer-readable medium, a number of viewing actions of the first user, each of the number of viewing actions represents a viewing of one of the candidate user profiles in the first set of the candidate user profiles by the first user;

for each of the number of recorded viewing actions, recording, by the at least one processor in the at least one nontransitory computer-readable medium, whether each of the selected UUPAVs is present in each of the respective candidate user profiles in the first set of candidate user profiles viewed by the first user;

recording, by the at least one processor in the at least one nontransitory computer-readable medium, a number of contact actions of the first user, each of the number of contact actions represents a contact between the first user and respective ones of candidate users represented by the first set of candidate user profiles;

for each of the number of recorded contact actions, recording, by the at least one processor in the at least one nontransitory computer-readable medium, whether each of the selected UUPAVs is present in each of the respective candidate user profiles in the first set of candidate user profiles contacted by the first user;

for each of the selected UUPAVs, determining, by the at least one processor, a frequency for the selected UUPAV, wherein the determined frequency represents a frequency with which the user views candidate user profiles having the selected UUPAV or contacts users having the selected UUPAV;

for each of the selected UUPAVs, generating, by the at least one processor, a weighting factor based at least in part on a comparison between the determined frequency of the selected UUPAVs for the first user and the determined population frequency for the selected UUPAVs;

querying the data store by the at least one processor on behalf of the first user for a second set of candidate user profiles based at least in part on the generated weighting factors for the selected UUPAVs; and providing, by the at least one processor, the second set of the candidate user profiles to the first user; and applying a random sample percentage to augment the second set of the candidate user profiles with a percentage of randomly selected candidate user profiles based on the random sample percentage.

* * * * *